United States Patent [19]

Fujita et al.

[11] 4,252,781
[45] Feb. 24, 1981

[54] PREPARATION OF SODIUM CARBONATE ANHYDRIDE

[75] Inventors: Yosisige Fujita; Shigeki Ishine; Kazuyoshi Morita, all of Ube, Japan

[73] Assignee: Central Glass Company, Limited, Japan

[21] Appl. No.: 26,449

[22] Filed: Apr. 2, 1979

Related U.S. Application Data

[63] Continuation of Ser. No. 830,149, Sep. 2, 1977, abandoned.

[30] Foreign Application Priority Data

Sep. 3, 1976 [JP] Japan .................. 51-104930

[51] Int. Cl.³ .............................................. C01D 7/37
[52] U.S. Cl. .................................. 423/427; 423/195; 423/421
[58] Field of Search ............... 423/206 T, 421, 427, 423/438, 426, 188, 189, 195; 23/302 T

[56] References Cited

U.S. PATENT DOCUMENTS

| 439,330 | 10/1890 | Straub | 423/427 |
|---|---|---|---|
| 2,005,868 | 6/1935 | MacMullin | 423/427 |
| 2,133,455 | 10/1938 | Keene et al. | 423/427 |
| 2,183,324 | 12/1939 | Reich | 423/438 |
| 3,113,834 | 12/1963 | Beecher et al. | 423/426 |
| 3,246,962 | 4/1966 | Miller | 423/206 T |
| 3,264,057 | 8/1966 | Miller | 423/206 T |
| 3,451,767 | 6/1969 | Saeman et al. | 423/426 |

FOREIGN PATENT DOCUMENTS 9425 of 1885 United Kingdom .................. 423/427

OTHER PUBLICATIONS

Hou Tepang Manufacture of Suda Reinhold Publishing Co. NY NY 1942 pp. 342-349.

Primary Examiner—Herbert T. Carter
Assistant Examiner—Gary P. Straub
Attorney, Agent, or Firm—Fleit & Jacobson

[57] ABSTRACT

A thick suspension of sodium carbonate anhydride is obtained by countercurrent contacting of a high pressure steam and a suspension of sodium bicarbonate or sodium sesquicarbonate in a concentrated solution of sodium carbonate. The decomposition reaction is promoted to near completion by maintaining the reaction temperature above 150° C. to realize a high $HCO_3^-$ ion concentration in the solution. The sodium carbonate anhydride suspension is cooled to cause transition of the anhydride to the monohydrate, followed by the separation of the crystalline monohydrate from the mother liquor. Calcination of this monohydrate gives a dense soda ash featuring a high purity and a uniform particle size, while the mother liquor is recycled for the preparation of the sodium bicarbonate suspension.

4 Claims, 3 Drawing Figures

PREPARATION OF SODIUM CARBONATE ANHYDRIDE

This application is a continuation of application Ser. No. 830,149 filed Sept. 2, 1977, now abandoned.

BACKGROUND OF THE INVENTION

This invention relates to the preparation of sodium carbonate through wet calcination of sodium bicarbonate or sodium sesquicarbonate by contact with steam and, further, to the conversion of a wet product into dense soda ash of a practically uniform particle size.

Sodium carbonate, immensely consumed in many industries, is obtained mostly by the pyrolysis of sodium bicarbonate or sodium sesquicarbonate prepared by the ammonia soda process or ammonium chloride soda process. In the ammonia soda process, carbon dioxide gas is passed through an ammonia-saturated salt-water to precipitate sodium bicarbonate, followed by separation of the precipitate and washing. This crude sodium bicarbonate is calcined to give sodium carbonate as represented by the following equation.

$$2NaHCO_3 + heat \rightarrow Na_2CO_3 + CO_2 \uparrow + H_2O \quad (1)$$

In soda plants where the ammonia soda process is employed, it is a usual practice to prepare sodium hydroxide by adding lime milk to a sodium carbonate solution to accomplish causticization according to the following equation.

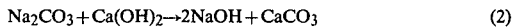

$$Na_2CO_3 + Ca(OH)_2 \rightarrow 2NaOH + CaCO_3 \quad (2)$$

For this purpose, a so-called "wet calcination" process for the preparation of a sodium carbonate solution is more prevailing than the above described dry calcination process. In the wet calcination process, crude sodium bicarbonate is poured into water with stirring to give a suspension which is about 580 g/l in concentration of $NaHCO_3$, and the suspension is allowed to make a countercurrent contact with a slightly pressurized steam in a decomposition tower of the type having bubble-cap plates or perforated plates in a multi-deck arrangement to achieve an efficient gas-liquid contact. Through pyrolysis in the decomposition tower, the bicarbonate suspension turns into a relatively thick sodium carbonate solution in which the $Na_2CO_3$ concentration is about 300 g/l.

The decomposition of sodium bicarbonate in this process, however, is always incomplete: the decomposition remains only 85-87% at the highest. As a consequence, the above described causticization of the resultant sodium carbonate solution (hereinafter soad solution) requires a considerable excess of lime milk, meaning a wasteful contribution to the cost of caustic soda, since the bicarbonate remaining undecomposed in the soda solution consumes twice as much equivalence of calcium hydroxide than the carbonate.

In the case of providing sodium carbonate anhydride as a commercial chemical, commonly under the name of soda ash, the anhydride must take the form of crystalline particles of a relatively high bulk density such as 1.05–1.2 g/cm$^3$ (so-called dense ash) having uniform particle size. The calcination of crude sodium bicarbonate obtained in the ammonia soda process gives sodium carbonate anhydride particles of a relatively low bulk density, that is, a so-called light ash. The light ash is sufficiently moistened with water and then kneaded to form crystalline sodium carbonate monohydrate. The calcination of the crystalline monohydrate gives the anhydride as crystalline particles with a bulk density worthy of a dense ash. As a disadvantage of this method, it is difficult to obtain a dense ash having a satisfactorily uniform particle size. One must regulate the particle size of the calcined product by sieving to obtain a commercially valuable soda ash.

When naturally occurring trona (chemically, sodium sesquicarbonate) is used as the material of soda ash, dense ash is obtained by first calcining trona, preparing a solution of the resultant sodium carbonate anhydride, removing impurities from the solution, concentrating the solution to cause sodium carbonate monohydrate to crystallize from the solution and calcining the crystalline monohydrate separated from the solution. In this case it is possible to obtain dense ash of a satisfactorily uniform particle size by adopting some measures to control the crystallization of the monohydrate from the concentrated solution. However, only a limited supply of soda ash comes from naturally occurring trona.

Referring again to the ammonia soda process, it has been tried to obtain sodium carbonate anhydride as dense ash from the above described soda solution through concentration for crystallization of sodium carbonate monohydrate and calcination of the monohydrate following the separation from the mother liquor and washing. In this case, however, the incomplete decomposition of sodium bicarbonate at the wet calcination offers a serious problem to the crystallization of the sodium carbonate monohydrate. It is inevitable that sodium sesquicarbonate crystallizes from the soda solution obtained in this process together with sodium carbonate, resulting in that soda ash given by the wet calcination is satisfactory neither in purity nor in bulk density. Besides, a large energy consumption is needful for the concentration of the soda solution. According to one of improvements hitherto proposed on this method, the soda solution is made to turn into a complete sodium carbonate solution by the addition of caustic soda prior to the concentration of the solution, but this improvement does not solve the problem of large energy consumption for the concentration since the soda solution obtained by the wet calcination process is always an undersaturated solution. Due to such an uneconomical nature, use has not been made of the soda solution obtained by the wet calcination process in the industrial preparation of soda ash.

SUMMARY OF THE INVENTION

It is an object of the present invention to provide a highly efficient process for the preparation of sodium carbonate anhydride from crude sodium bicarbonate or sodium sesquicarbonate which process can achieve a nearly complete decomposition of the bicarbonate.

It is another object of the invention to provide an improved process for the preparation of dense soda ash which is high in purity and practically uniform in particle size from crude sodium bicarbonate or sodium sesquicarbonate, which process features a great saving of heat energy for crystallization of sodium carbonate monohydrate as an intermediate in addition to the favorable properties of the obtained dense soda ash.

In the present application, the term "sodium bicarbonate" means not only sodium hydrogen carbonate but also sodium sesquicarbonate and a mixed phase of these two substances.

According to the invention, a process for the preparation of sodium carbonate anhydride comprises the steps of preparing a suspension of sodium bicarbonate in a concentrated aqueous solution of sodium carbonate and decomposing the suspended sodium bicarbonate by countercurrent contacting of the suspension and a pressurized steam at temperatures above 150° C. This process gives sodium carbonate anhydride in the form of a suspension in a saturated sodium carbonate solution. This solution can be recycled, after the separation of the solid phase, for the preparation of the bicarbonate suspension.

The countercurrent contacting of the bicarbonate suspension, whose $NaHCO_3$ concentration preferably ranges from 300 to 600 g/l, and a pressurized steam is accomplished in a decomposition tower having a number of bubble-cap plates or perforated plates in multi-deck arrangement preferably at absolute pressures between 5 and 12 $kg/cm^2$ in a lowermost section of the tower where the steam is introduced and between 1 and 10 $kg/cm^2$ in an uppermost section where the suspension is introduced in order to satisfy the above stated temperature requirement and, as a consequence, maintain a high $HCO_3^-$ ion concentration in the solution.

In this process, the decomposition of the sodium bicarbonate easily reaches 96–99% by weight.

Another aspect of the invention, a process for the preparation of sodium carbonate anhydride in the form of crystalline particles of a relatively high bulk density, comprises the steps of preparing a sodium carbonate suspension through the above stated steps, lowering the temperature of the sodium carbonate suspension below the transition point between the anhydride and the monohydrate of sodium carbonate thereby to allow the transition of the sodium carbonate anhydride in the suspension to the monohydrate, separating the resultant crystalline monohydrate from the mother liquor and calcining the separated monohydrate to give crystalline particles of sodium carbonate anhydride and recycling the mother liquor for use in the preparation of the sodium bicarbonate suspension.

The transition from the anhydride to the monohydrate is efficiently achieved by maintaining the temperature of the suspension about 5° to 20° C. below the transition point with the condition that a sufficient amount of seed crystals of the monohydrate are always present in the suspension while the transition proceeds. The anhydride suspension may somewhat be concentrated by means of a liquid cyclone or a thickener prior to the completion of the temperature reduction.

The dense soda ash obtained by this process has a very high purity and is uniform in its particle size to the full satisfaction of consumers.

DESCRIPTION OF PREFERRED EMBODIMENTS

A process according to the invention yields a suspension of sodium carbonate particles in a sodium carbonate solution containing minor amounts of sodium bicarbonate and sodium chloride. The mother liquor of this suspension is used as a concentrated sodium carbonate solution in the preparation of a sodium bicarbonate suspension at the first step of the process. This solution is introduced into a tank provided with an agitator, and a crude sodium bicarbonate obtained by, for example, the soda ammonia process is added to the solution in such an amount that a resultant suspension contains 300 to 600 grams per liter of $NaHCO_3$ as the suspended solid particles. It is desirable that the suspension be maintained at a temperature as high as about 80° C. or above; a temperature of 90° C. or above is most preferable. Most of the crude sodium bicarbonate added to the solution dissolves in the solution and partly crystallizes out as sodium sesquicarbonate. The addition of the crude sodium bicarbonate is performed with agitation sufficient to obtain a well dispersed suspension and to aid the subsequent handling of the suspension. Instead of an industrially prepared crude sodium bicarbonate, naturally occurring trona may be used for the preparation of the above described crude sodium bicarbonate suspension.

Figure 1:
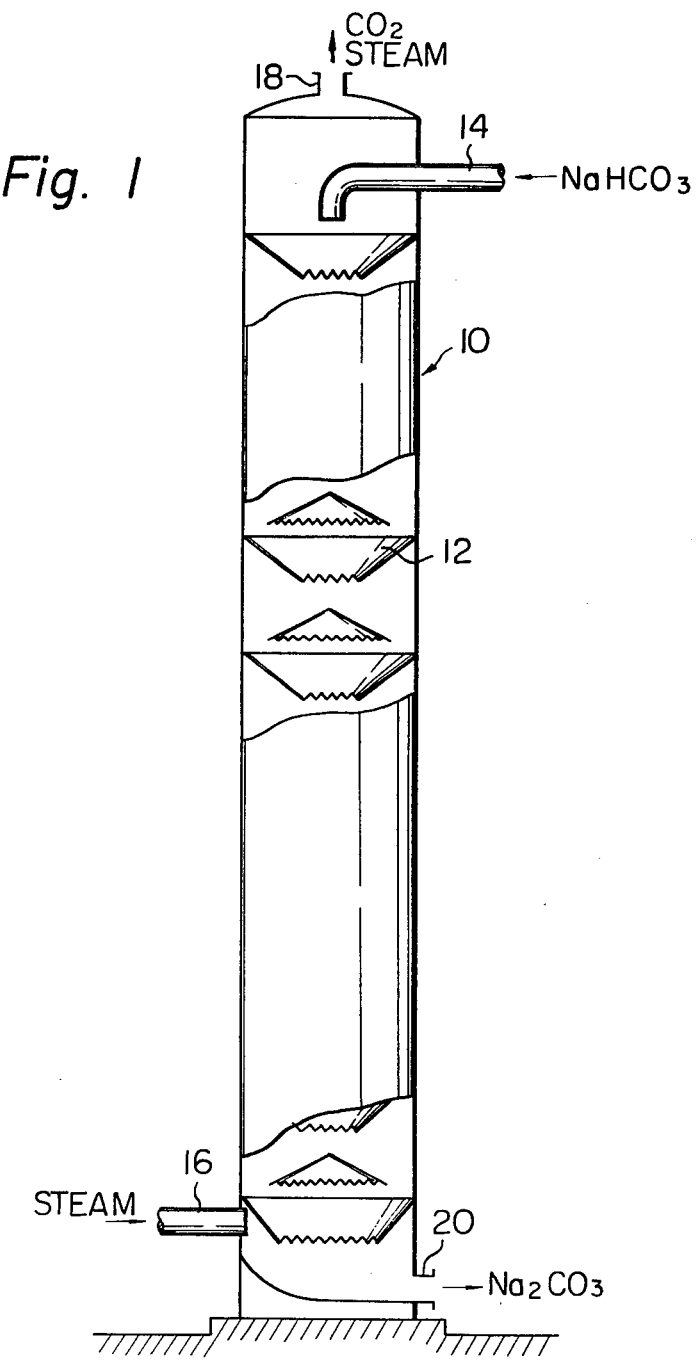
FIG. 1 is a sketch, partly in section, of a decomposition tower used in a process according to the invention.

To allow an efficient gas-liquid contact between a pressurized steam and the suspension or slurry thus prepared, the process of the invention utilizes a decomposition tower which can be operated at high pressures and which has a number of either bubble-cap plates or perforated (or slotted) plates designed to preclude deposition of solid matter thereon in a multi-deck arrangement. FIG. 1 illustrates the decomposition tower as a bubblecap tower 10 having a number of bubble-cap plates 12 in spaced layers. The decomposition tower 10 has a liquid inlet 14 at its top section, a gas inlet 16 at a bottom section, a gas outlet 18 at the top and a liquid outlet 20 at the bottom. The sodium bicarbonate slurry is introduced into the tower 10 through the inlet 14 so as to occupy the entire volume of the tower 10 and continuously flow downwards by gravity. In this state, steam pressurized to an absolute pressure of 5–12 $kg/cm^2$ is blown into the tower 10 through the inlet 16 so as to realize a countercurrent contacting of the descending slurry and the ascending steam. The design of the tower 10 and the pressure of the steam are such that the pressure in the tower 10 is 5–12 $kg/cm^2$ (absolute) in a lowermost section and 1–10 $kg/cm^2$ (absolute) in an uppermost section.

The temperature in each section of the tower 10 reaches and remains at the boiling point of the slurry under the pressure in the same section so that the sodium bicarbonate in the tower 10 exhibits very high solubilities. Accordingly, the sodium bicarbonate readily undergoes pyrolysis into sodium carbonate upon contact with the steam. Since the liquid phase of the slurry is already saturated with sodium carbonate, the formation of sodium carbonate by the pyrolysis results in the precipitation of crystalline sodium carbonate anhydride. Before the arrival at the bottom of the tower 10, the sodium bicarbonate slurry turns into a slurry whose solid matter is entirely sodium carbonate anhydride with a concentration of 200–400 g/l. The reaction in the decomposition tower 10 is represented by Equation (1), and the decomposition of the sodium bicarbonate easily reaches the level of 96–99%.

The reason for such a high extent of decomposition is considered as follows.

The rate of the decomposition reaction in the tower 10 is governed by the $HCO_3^-$ ion concentration in the soda solution: the higher the $HCO_3^-$ ion concentration is, the higher the partial pressure of $CO_2$ in the tower 10 and hence the rate of decomposition become, and vice versa. In the present invention, the decomposition reaction condition in the tower 10 is set with the aim of realizing sufficiently high $HCO_3^-$ ion concentrations.

Figure 2:
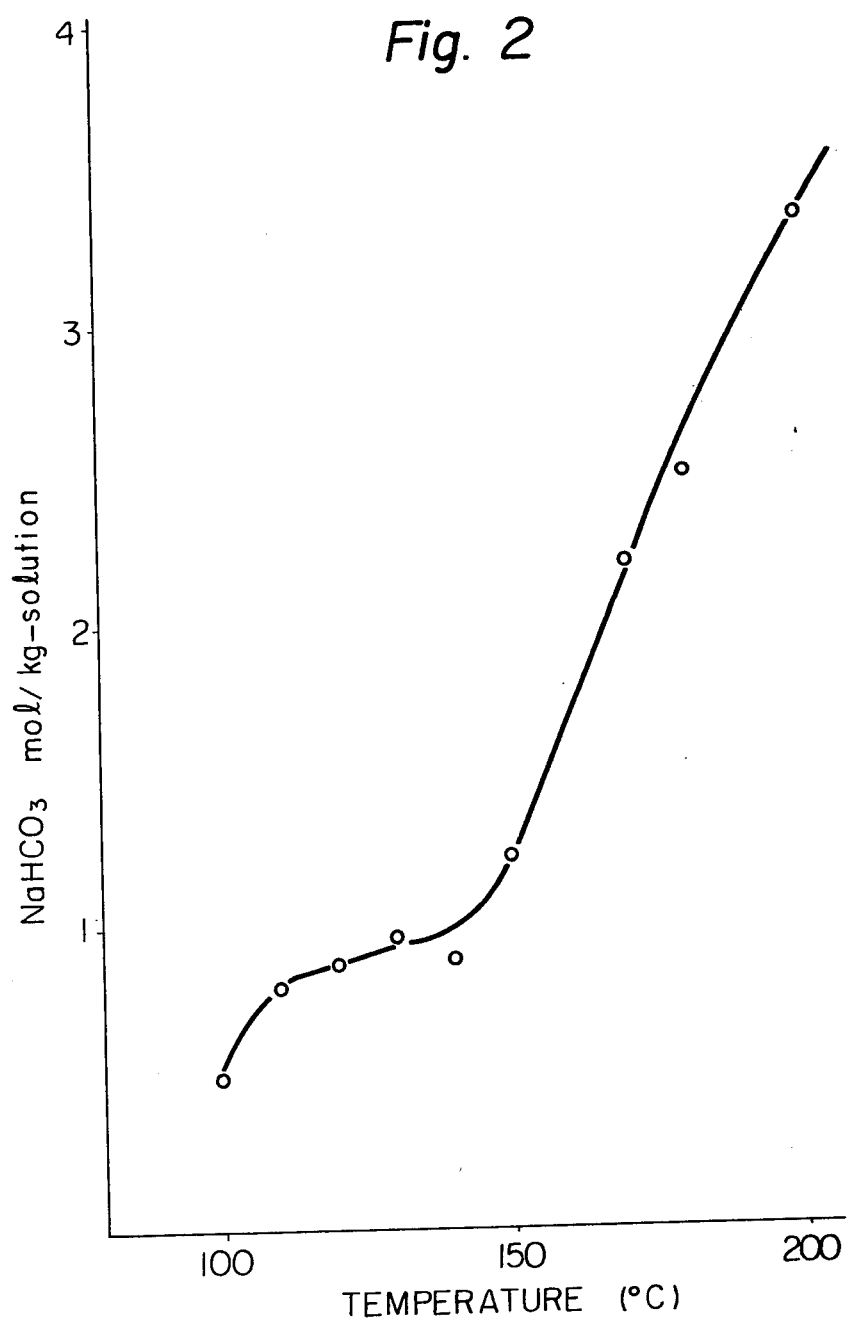
FIG. 2 is a temperature-solubility curve for the explanation of a reaction condition in a process according to the invention.

With regard to a $NaHCO_3$—$Na_2CO_3$—$H_2O$ system at temperatures between 100° and 200° C., FIG. 2 shows the variation in a critical $NaHCO_3$ concentration below which $Na_2CO_3$ alone is stable as a substance at the bottom of the liquid, a solid phase at temperatures between 100° and 200° C. At 130° C. for example, anhydrous $Na_2CO_3$ is stable as a solid phase while the $NaHCO_3$ concentration is below 0.9 mol/kg, but $Na_2CO_3 \cdot 2NaHCO_3 \cdot 2H_2O$ begins to precipitate from the solution when the concentration exceeds 0.9 mol/kg. At 160° C., anhydrous $Na_2CO_3$ is stable as a solid phase until the $NaHCO_3$ concentration increases to 1.6 mol/kg but $Na_2CO_3 \cdot 3NaCHO_3$, precipitates as a solid phase at higher $NaHCO_3$ concentrations. It is a noteworthy fact that the $HCO_3^-$ ion concentration in this system exhibits a sharp increase when the temperature exceeds 150° C.

In the present invention, the temperature in the decomposition tower 10 is maintained above 150° C. with the intention of maintaining sufficiently high $HCO_3^-$ ion concentrations so that the decomposition of sodium bicarbonate, i.e. liberation of $CO_2$ gas, may be facilitated. In addition, sodium bicarbonate is added to the soda solution in such an amount that the presence of a solid phase comprising $NaHCO_3$ as a solid phase is assured throughout the proceeding of the decomposition. As a consequence, sodium carbonate formed by the decomposition of the bicarbonate immediately precipitates from the solution as the anhydride which is stable as a solid phase. Since in this process crude sodium bicarbonate is supplied in the form of a thick slurry, most of the supplied bicarbonate is present as suspended particles and hence readily undergoes decomposition. When the decomposition proceeds to such an extent that $NaHCO_3$ is no longer present as a solid phase, there occurs a rapid lowering in the $HCO_3^-$ ion concentration in the soda solution. This phenomenon, however, occurs when the slurry nears the bottom of the tower 10, so that the slurry having a lowered $HCO_3^-$ concentration makes a countercurrent contact with the steam in the presence of little $CO_2$ gas. Accordingly the decomposition of the bicarbonate can proceed even in this state and reaches near completion before the arrival at the bottom of the tower 10.

To achieve a sufficiently high extent of decomposition such as 96–99%, the passage of the bicarbonate slurry through the decomposition tower 10 must take a certain amount of time sufficient to the completion of the decomposition. The rate of the decomposition is primarily governed by the $HCO_3^-$ ion concentration in the soda solution but is influenced also by the rate of dissolution of $NaHCO_3$ present as a solid phase and the rate of crystal growth of the anhydrous $Na_2CO_3$ formed by the decomposition. It is preferable that the sodium bicarbonate slurry stays in the tower 10 for 0.5 to 2 hours.

Figure 3:
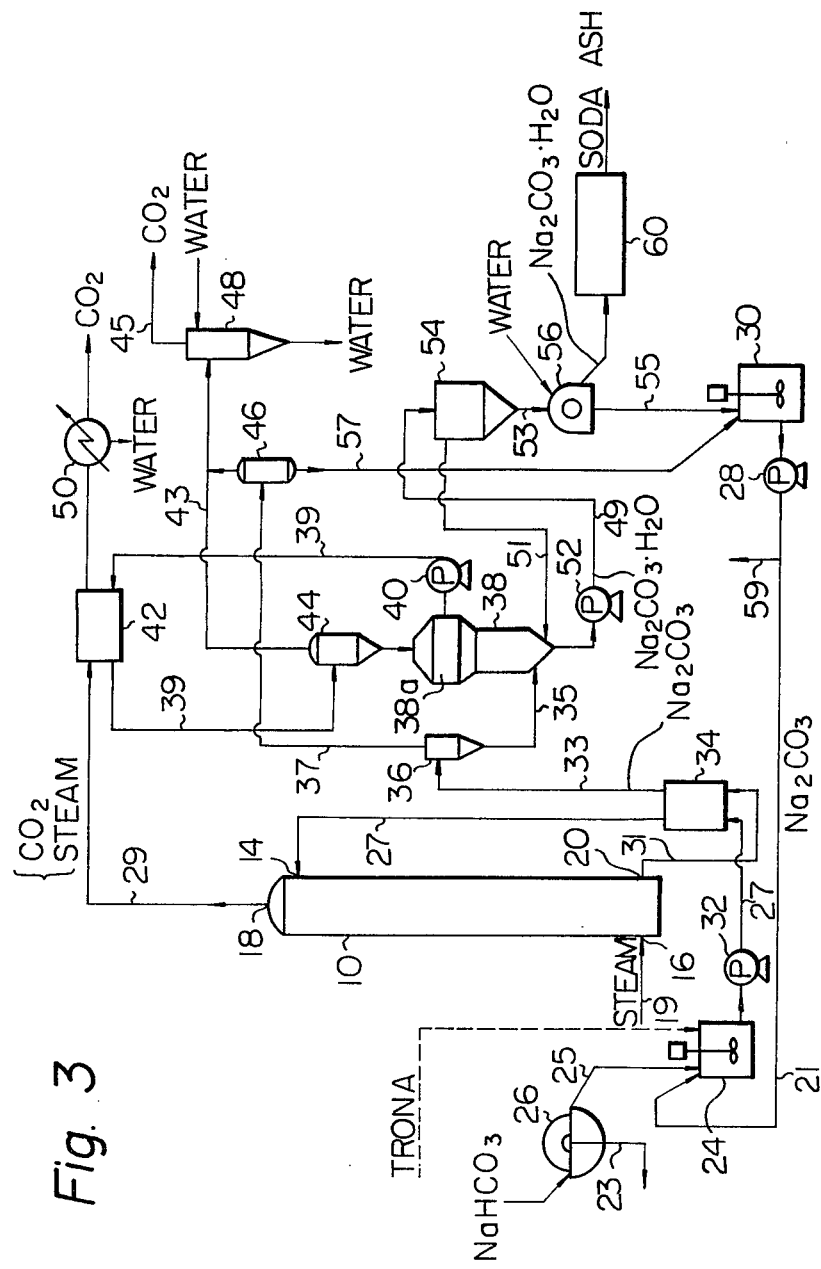
FIG. 3 is a flow diagram showing a process according to the invention.

The decomposition tower 10 is analogous to a fractionating tower and serves the function of $CO_2$ gas stripping. The $CO_2$ gas generated by the decomposition reaction in the tower 10 is carried by the pressurized steam and discharged through the outlet 18 at the top of the tower 10. Referring to FIG. 3, the steam-$CO_2$ mixture is passed through line 29 still in a pressurized state to a cooling apparatus 50 via a heat exchanger 42 to condense the steam. The draining of the condensate leaves a practically pure $CO_2$ gas, which can be supplied to a carbonating tower in the ammonia soda process without the need of pressurizing.

The sodium carbonate anhydride slurry discharged from the bottom outlet 20 of the decomposition tower 10 is passed through line 31 to a heat exchanger 34 to transfer its heat to the sodium bicarbonate slurry which is to be supplied to the decomposition tower 10 through line 27.

EXAMPLE 1

A sodium bicarbonate slurry was continuously prepared in a mixing tank 24 which had a volume capacity of 5000 liters and was provided with an agitator. A hot soda solution containing 27 Wt% $Na_2CO_3$, 2.6 Wt% NaCl and 2.0 Wt% $NaHCO_3$ was supplied through line 21 from a mother liquor reservoir 30 by means of a pump 28 to the mixing tank 24 at a rate of 3200 kg/hr. At the same time, a crude sodium bicarbonate suspension obtained by the soda ammonia process was passed through a filter 26 to feed a wet sodium bicarbonate (85% $NaHCO_3$) to the mixing tank 24 at a rate of 1200 kg/hr. The soda solution and the crude sodium bicarbonate were well mixed by continuous stirring in the tank 24 at temperatures above 90° C. The resultant sodium bicarbonate slurry was pressurized by means of a pump 32 in line 27, heated to 130° C. in the heat exchanger 34 and then introduced into the decomposition tower 10 through the top inlet 14. In this example, the tower 10 was 0.76 m in diameter and 15 m in height and had 14 layers of bubble-cap plates 12. Concurrently, steam pressurized to an absolute pressure of 5.5 kg/cm² was introduced into the tower 10 through the bottom inlet 16 at a constant rate of 750 kg/hr to make a countercurrent contact with the descending bicarbonate slurry. As a result, a sodium carbonate anhydride slurry was discharged from the bottom outlet 20 of the tower 10 at a rate of 4370 kg/hr. The temperature of this slurry was 156° C., and the amount of the solid matter in this slurry was 11.3% by weight. This slurry was cooled to 115° C. and then concentrated to give 1400 kg of sodium carbonate anhydride slurry having a solid matter concentration of 35 Wt% and 2970 kg of mother liquor. The composition of the concentrated slurry was found to be as follows.

| solid phase: | $Na_2CO_3$ | 490 kg |
| --- | --- | --- |
| liquid phase: | $Na_2CO_3$ | 235 kg |
| | $NaHCO_3$ | 21 kg |
| | NaCl | 22 kg |

The decomposition rate calculated on the basis of the supplied sodium bicarbonate was 97%.

An embodiment of a process for the preparation of a dense soda ash from the sodium carbonate slurry obtained by the above described and illustrated procedures will be described in detail with reference to FIG. 3.

The sodium carbonate slurry discharged from the decomposition tower 10 is introduced into the heat exchanger 34 through line 31 to transfer its heat to the sodium bicarbonate slurry passing through line 27. The cooled sodium carbonate slurry is passed to a liquid cyclone 36 through line 33 to be concentrated. Alternatively, the slurry may be concentrated under a pressurized state by means of a thickener. Line 35 transmits the concentrated slurry to a crystallization tank 38, while the supernatant solution is passed through line 37 to a flash tank 46 for pressure reduction to the atmospheric pressure and thereafter passed to the mother liquor reservoir 30 through line 57.

A supernatant fraction of the slurry in the crystallization tank 38 is passed to the heat exchanger 42 through line 39 by means of a pump 40 to receive heat from the steam-$CO_2$ mixture flowing through line 29. The heated solution is introduced into a reduced pressure cooler 44 and then returned to the crystallization tank 38 in a cooled and slightly concentrated state. The vapor generated in the reduced pressure cooler 44 is sucked by vacuum through line 43 into a condenser 48. The vapor discharged from the flash tank 46 also is sucked into the condenser 48 through line 43 to condense steam in these vapors by external water and recover $CO_2$ gas through line 45. Thus the temperature of sodium carbonate slurry in the crystallization tank 38 can be maintained 5° to 20° C. below the transition point (about 100° C.) between the anhydride and monohydride of sodium carbonate, resulting in the transition of the anhydride in the slurry to the monohydrate. When the process is performed continuously, care should be taken to maintain the presence of sodium carbonate monohydrate seed crystals in an amount sufficient to the compensation for the discharge of the monohydrate slurry from the crystallization tank 38. The quantity of the monohydrate seed crystals in the tank 38 should be more than three times, preferably at least five times, as large as the quantity of the monohydrate withdrawn from the tank 38 in order to suppress the precipitation of very fine monohydrate crystals from the solution. Crystalline sodium carbonate monohydrate crystallized in the tank 38 is used as the seed crystals. An upper section 38a of the crystallization tank 38 serves as a clarification chamber, and the aforementioned supernatant fraction of the sodium carbonate slurry is withdrawn from this section 38a of the tank 38. The extent of clarification in this section 38a is controlled so as to regulate the quantity of fine crystals contained in the mother liquor passed through line 39. These fine crystals are dissolved in the mother liquor upon heating in the heat exchanger 42.

Considering the reaction in the decomposition tower 10 and the transition in the crystallization tank 38 altogether, a sole input to the reaction system is crude sodium bicarbonate and the output is sodium carbonate monohydrate and carbon dioxide. The entire reaction may be summarized as:

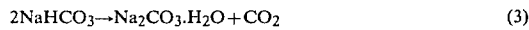

$$2NaHCO_3 \rightarrow Na_2CO_3 \cdot H_2O + CO_2 \tag{3}$$

Theoretically, no water enters or leaves the reaction system. In practice, however, some water is introduced into the reaction system as the moisture of the crude sodium bicarbonate, wash water for the washing of the sodium carbonate monohydrate and a condensed portion of the steam used in the decomposition tower 10, so that there is a need of discharging excess water from the reaction system by the accomplishment of evaporation and/or the provision of a purge line 59 to the line 21 connecting the mother liquor reservoir 30 to the mixing tank 24. The cooling in the reduced pressure cooler 44 following the heating in the heat exchanger 42 cause evaporation discharge of some water by the use of the spent steam as a sole heat source.

The rate of crystal growth in the crystallization tank 38, other than the above described quantity of the seed crystals, is an important factor in the control of the particle size distribution of the monohydrate crystals. This rate of crystal growth is related to the rate of transition from the anhydride to the monohydrate, and the maintenance of the slurry temperature in the crystallization tank 38 within the range below the transition point by 5°–20° C. results in a favorable rate of the transition.

The sodium carbonate monohydrate slurry discharged from a lowermost section of the crystallization tank 38 is passed to a thickening tank 54 through line 49 by means of a pump 52 and a supernatant fraction of the slurry is recycled from the thickening tank 54 to the crystallization tank 38. The thickened monohydrate slurry is introduced through line 53 into a separator 56 of, for example, the centrifugal type. After separation from mother liquor, the monohydrate crystals are washed with a small quantity of water and thereafter subjected to calcination in a heating apparatus 60 such as a multi-tube steam heater of the rotary type to give soda ash through dehydration. The mother liquor is passed through line 55 to the reservoir 30 for the recycle to the mixing tank 24.

EXAMPLE 2

A sodium bicarbonate slurry was prepared generally in the same manner as in Example 1. In this case the mixing tank 24 had a volume capacity of 10 m$^3$, and a soda solution recycled from the reservor 30 at a rate of 8.54 tons per hour contained 27 Wt% $Na_2CO_3$, 2.4 Wt% NaCl and 0.6 Wt% $NaHCO_3$. The feed rate of a crude sodium bicarbonate (86.76 Wt% $NaHCO_3$, 0.44 Wt% NaCl and 12.80 Wt% $H_2O$) to the mixing tank 24 was 3.06 tons per hour. These materials were well mixed by continuous stirring at 90° C. The decomposition tower 10 was 1.6 m in diameter and 20 m in height and had 18 layers of bubble-cap plates 12. The sodium bicarbonate slurry was pumped to this tower 10 via the heat exchanger 34 at a constant rate so that the liquid level in the mixing tank 24 remained constant. Concurrently, steam pressurized to an absolute pressure of 6 kg/cm$^2$ was introduced into the tower 10 from the bottom at a constant rate of 1.55 tons per hour to make a countercurrent contact with the descending bicarbonate slurry. The temperature in the tower 10 was 145° C. in an uppermost section and 160° C. in a lowermost section. The rate of gas discharge from the top of the tower 10 was 1.86 tons per hour with the composition of 37.4 Wt% $CO_2$ and 62.6 Wt% $H_2O$.

A sodium carbonate anhydride slurry discharged from the decomposition tower 10 was cooled in the heat exchanger 34 and then concentrated in the liquid cyclone 36. The liquid portion discharged from the cyclone 36 was passed to the mother liquor reservoir 30 via the flash tank 46, and the concentrated portion was introduced into the crystallization tank 38 in which was already present a sodium carbonate monohydrate bed (given by a precedent operation). The crystallization tank 38 in this example had a volume capacity of 40 m$^3$ and was associated with the reduced pressure cooler 44 and the heat exchanger 42. The slurry temperature in the crystallization tank 38 remained at 80° C. as the result of pressure reduction to the atmospheric pressure and a partial evaporation. A supernatant fraction of the slurry was recycled through line 39 as previously described. A sodium carbonate monohydrate slurry withdrawn from the crystallization tank 38 was passed to the centrifugal separator 56 via the thickening tank 54. Following separation from mother liquor and washing with water, the crystalline sodium carbonate monohydrate was calcined at temperatures between 160° and 180° C. in the rotary furnace 60. As a consequence, a dense soda ash was obtained at a rate of 1.55 tons per hour. The mother liquor gathered in the reservoir 30 had the composition presented at the preparation of the sodium bicarbonate slurry. This mother liquor was recycled to the mixing tank 24 except for purging of a small amount for the balance of NaCl and $H_2O$.

The soda ash obtained in this example had a bulk density of 1.20 g/cm$^3$. The particle size distribution examined with standard sieves and the analysis of this soda ash were as presented in Tables 1 and 2, respectively.

TABLE 1

| Particle size | Wt % |
|---|---|
| 20 mesh(0.883 mm) + | 1.3 |
| 28 mesh(0.589 mm) + | 6.5 |
| 35 mesh(0.417 mm) + | 16.7 |
| 48 mesh(0.295 mm) + | 53.5 |
| 65 mesh(0.208 mm) + | 13.8 |
| 100 mesh(0.147 mm) + | 5.5 |
| 100 mesh(0.147 mm) − | 2.7 |

TABLE 2

| $Na_2CO_3$ | 99.87 Wt % |
|---|---|
| NaCl | 0.13 Wt % |
| Total | 100 |

What is claimed is:

1. A process for the preparation of sodium carbonate anhydride in a decomposition tower having an uppermost section, a reaction system section, a lowermost steam introduction section and a lowermost section, said process consisting of the steps of:
   (a) preparing a suspension of sodium bicarbonate in a concentrated aqueous solution of sodium carbonate recycled from step (h), so that the suspension contains from about 300 to 600 g/l of sodium bicarbonate;
   (b) continuously introducing the suspension into the uppermost section of the decomposition tower;
   (c) continuously introducing a substance consisting of pressurized steam into the lowermost steam introduction section of the decomposition tower;
   (d) decomposing in the reaction system section the sodium bicarbonate solely by countercurrent contacting the suspension and the steam at a temperature between about 150° and about 200° C., while controlling the rate of introduction and the concentration of the sodium bicarbonate so that the concentration of sodium bicarbonate in the reaction system section of the tower is above a temperature-dependent critical value, said value being about 1 mol/kg of solution at 150° C., and increasing with increasing temperature to about 3 mol/kg of solution at 200° C., and further, so that a solid phase comprising both sodium carbonate and sodium bicarbonate is always present in the reaction system section of the decomposition tower, whereby the decomposition of the sodium bicarbonate takes place while a high $HCO_3^-$ ion concentration is maintained in the liquid phase of the reaction system while $CO_2$ gas is liberated;
   (e) passing the product from the reaction system section through the steam introduction section to achieve an overall 96 to 99% decomposition and obtaining sodium carbonate anhydride as a suspension in a saturated aqueous solution of sodium carbonate anhydride in the lowermost section of the tower;
   (f) lowering the temperature of said suspension of sodium carbonate anhydride to about 5° to 20° C. below the transition point between the anhydride and the monohydrate of sodium carbonate while the suspension is settled in a crystallization tank in which seed crystals of sodium carbonate monohydrate are always present, thereby to cause the transition of sodium carbonate anhydride in the cooled suspension to sodium carbonate monohydrate;
   (g) separating crystalline sodium carbonate monohydrate from mother liquor of the cooled suspension;
   (h) recycling said mother liquor for use as said concentrated aqueous solution of sodium carbonate; and
   (i) calcining the separated sodium carbonate monohydrate causing the transition thereof of sodium carbonate anhydride to produce dense soda ash.

2. A process as claimed in claim 1, wherein said countercurrent contacting is accomplished by flowing said suspension of sodium bicarbonate downwards in a decomposition tower having in a multi-deck arrangement means for promoting gas-liquid contact and passing said steam upwards through said decomposition tower, said steam being pressurized such that the absolute pressure in said decomposition tower is 5–12 kg/cm$^2$ in a lowermost section where said steam is introduced and 1–10 kg/cm$^2$ in an uppermost section where said suspension of sodium bicarbonate is introduced.

3. A process as claimed in claim 2, wherein the residence time in said decomposition tower is at least 0.5 hr.

4. The process of claim 1 further comprising the steps of withdrawing a supernatant portion of said suspension settled during the temperature lowering step from said crystallization; raising the temperature of the withdrawn supernatant portion by an indirect heat exchange with the steam used for decomposing said said sodium bicarbonate, thereby causing a dissolution of fine crystals contained in said supernatant portion; and returning the supernatant portion subjected to said heat exchange to said crystallization tank through a cooler.

* * * * *